(12) United States Patent
Schwarzer

(10) Patent No.: US 8,667,815 B2
(45) Date of Patent: Mar. 11, 2014

(54) SETTING PLATE ARRANGEMENT

(75) Inventor: Siegfried Schwarzer, Stockse (DE)

(73) Assignee: Heye International GmbH, Obernkirchen (DE)

( * ) Notice: Subject to any disclaimer, the term of this patent is extended or adjusted under 35 U.S.C. 154(b) by 404 days.

(21) Appl. No.: 12/364,792

(22) Filed: Feb. 3, 2009

(65) Prior Publication Data
US 2009/0199596 A1 Aug. 13, 2009

(30) Foreign Application Priority Data

Feb. 12, 2008 (DE) .......................... 10 2008 008 630

(51) Int. Cl.
*C03B 27/00* (2006.01)
(52) U.S. Cl.
USPC ................ 65/348; 65/182.2; 65/25.1; 65/115
(58) Field of Classification Search
USPC ............. 65/167, 348, 355, 182.2, 182.1, 114, 65/115, 25.1–25.3
See application file for complete search history.

(56) References Cited

U.S. PATENT DOCUMENTS

| | | | | |
|---|---|---|---|---|
| 3,455,670 A | * | 7/1969 | McMaster | 65/182.2 |
| 4,548,635 A | * | 10/1985 | Nebelung | 65/84 |
| 4,679,148 A | * | 7/1987 | Wood | 700/158 |
| 5,266,095 A | * | 11/1993 | Futterknecht et al. | 65/234 |
| 5,609,659 A | * | 3/1997 | Peterson et al. | 65/29.11 |
| 2006/0284356 A1 | * | 12/2006 | Lim et al. | 269/20 |

FOREIGN PATENT DOCUMENTS

| | | |
|---|---|---|
| AT | 0321522 | 6/1989 |
| DE | 2715647 | 11/1977 |
| DE | 10039343 | 3/2001 |
| EP | 0149890 | 7/1985 |
| GB | 2123402 | 2/1984 |

* cited by examiner

*Primary Examiner* — Richard Crispino
*Assistant Examiner* — Yana Belyaev
(74) *Attorney, Agent, or Firm* — Fox Rothschild LLP

(57) ABSTRACT

In order to permit more effective cooling in comparison to the prior art, in particular in its floor area, of a hollow glass article (1) standing upright on the base (2) of a setting plate (4) provided with transcurrent orifices (9, 9', 9") forming a cavity (8) between a base (2) and the facing surface of the setting plate (4) of the standing surface (2"), it is proposed to utilize a part of the orifices (9) situated inside the standing surface (2") for the supply of cooling air into the cavity (8), and to utilize the remaining orifices (9') inside the standing surface (2") only for the extraction of cooling air from the cavity (8). By configuring the orifices (9, 9') that are utilized in each case for the supply and extraction of cooling air into and out of the cavity (8) so that they are at least approximately cross-sectionally identical, a throughput of cooling air through the cavity (8) and thus the available cooling performance can be varied within broad limits, but in the absence of an adverse effect on the stability of the hollow glass article (1) or a resulting risk of uncontrolled positional displacements on the setting plate (4).

19 Claims, 2 Drawing Sheets

SETTING PLATE ARRANGEMENT

BACKGROUND OF THE INVENTION

The invention relates to a setting plate arrangement for a glass molding machine.

The manufacturing process for hollow glass articles in a glass molding machine starting from their forming in a forming tool to their transfer into an annealing oven is characterized among other things by a perforated setting plate, on which the glass articles arrive in an upright standing position and are subjected to the cooling effect of at least one air flow. This cooling is required to improve the stability of the glass articles, in particular having regard for the immediately following transport processes in the rest of the process operation that are associated with unavoidable mechanical stresses. Previously disclosed is the design of the setting plate as the upper horizontal boundary of a chamber, into which cooling air is introduced, which air exits via orifices in the setting plate and is intended to exert a cooling effect on the glass articles that are standing thereon. A setting plate arrangement of this kind is disclosed by DE 100 39 343 A1 and DE 27 15 647 A1, for example.

Before being transferred to a conveyor belt system discharging into the annealing oven, minimum cooling of the hollow glass articles is thus necessary, although the time unavoidably required for this constitutes a factor that restricts the throughput through the glass molding machine and is accompanied by the requirement for an increase in the cooling intensity. Relatively tight limits are imposed on any increase in the cooling air flow taking into account the stability of the glass vessels and the risk of possible damage. In addition, any changes in the position of the glass articles must also be avoided having regard for the range of action of a sliding transfer mechanism for moving these onto the conveyor belt system once cooling is complete.

Previously disclosed in GB 2 123 402 A is a setting plate arrangement, of which the setting plate is provided with orifices in a uniform pattern and forms the upper boundary of a chamber that is arranged via a central pipe for the generation of a rising flow of cooling air emerging from the orifices, and via an annular gap for the generation of a suction effect and by this means a flow of cooling air that enters via the orifices and is thus downward-oriented. The glass article to be cooled is held initially with the tong-like holders of a take-out mechanism above the setting plate, in conjunction with which a downward-oriented flow of cooling air surrounding the glass article is generated. After a cylindrical enclosing body surrounding the glass article at a distance has been extended from the surface of the setting plate, an upward-oriented flow of cooling air is generated with the intention of producing a cooling effect in particular in the area of the base of the glass article. After the elapse of a predetermined interval of time, the glass article is set down on the setting plate followed by its transfer to a conveyor belt. A disadvantage associated with this embodiment is that cooling of the base of the glass article makes it necessary to hold the article above the level of the setting plate. This means that the holders of the take-out mechanism are not available during this period, at any rate not for picking up further glass articles from a forming tool of the glass molding machine.

Cooling of the base of the glass article as it is being held above a setting plate is also previously disclosed in AT 0 321 522 B, although the cooling air in this case is conditioned with a low-temperature fluid, for example liquid $CO_2$, $N_2$ or even He, for the purpose of improving the cooling performance. However, this procedure is associated with a considerable additional plant-specific technical investment plus the additional costs of the fluid.

Previously disclosed in EP 0 149 890 A1 is a setting plate arrangement, in the setting plate of which a central orifice on the base side and an arrangement of radially oriented surface grooves, uniformly distributed in the circumferential direction and originating from an area beneath the base and extending to an area that is radially outside the base, are allocated to each hollow glass article to be cooled. The areas between the grooves provide a supporting surface for the glass article, which is also surrounded by an arrangement of slot-shaped nozzles that are concentric with the central orifice. The central orifice is subjected to negative pressure, so that a first flow of air for cooling the base of the glass vessel is produced from the area above the surface grooves and the aforementioned central orifice and into a suction pipe connected thereto. The setting plate forms the upper part of a chamber that is subjected to compressed air, so that a second flow of air is produced, emerging from the nozzles, uniformly surrounding the side walls of the glass article and cooling them. Both the suction pipe and the chamber are connected by the intermediate arrangement of controllable valves to the suction side and the pressure side of a fan, so that operation adapted to the working rate of the glass molding machine is possible. The application of negative pressure in particular is intended to help to improve the stability of the glass article as it stands upright including at a high throughput. Although cooling of the base of the glass article as it stands upright is achieved in this embodiment, a significant increase in the cooling efficiency is countered inter alia by the disadvantage of a small maximum difference in the pressure of a flow of cooling air that is dependent on a suction effect as the driving force.

These previously disclosed setting plate arrangements thus require a compromise between the adequate base cooling of the articles and a risk of damage associated with transport. As a result, they do not offer at least any easily achievable approaches to a constructive design solution in order to increase the cooling performance and an associated throughput of glass articles.

SUMMARY OF THE INVENTION

The object of the invention is to make available a setting plate arrangement of the kind mentioned by way of introduction in a simple manner while retaining the stability of the hollow glass article as it stands upright with a view to increasing the cooling efficiency and the cooling performance. This object is achieved in such a setting plate arrangement for a glass molding machine having at least one setting plate held horizontally in a machine frame for the setting down of at least one hollow glass article intended for cooling and exhibiting a standing surface provided with orifices intended for the passage of cooling air and a cooling air supply line. In this arrangement, a part of the orifices situated inside the standing surface (referred to herein as a first part of the orifices) is arranged for the supply of cooling air and is in connection with the cooling air supply line, and another part of the orifices remaining inside the standing surface is arranged for the extraction of cooling air (referred to herein as a second part of the orifices). An all-over flow guide for the cooling air providing a transfer of heat with the base of the hollow glass article is arranged between the first and second parts of the orifices, and which orifices, situated within the standing surface, are arranged for the supply and extraction of cooling air with the intention that the largest possible throughput of cooling air can be achieved while retaining the stability of the hollow glass article as it stands upright on the standing surface while limiting the development of a back pressure.

It is important, for the purpose of cooling the base of the hollow glass article as it is standing upright on the setting plate, for a flow of cooling air to be provided which is in thermal exchange with the base, in conjunction with which, however, the formation of a back pressure which jeopardizes the stability of the hollow glass article is avoided by permitting the cooling air that is conducted in the direction of the base to flow away largely without encountering any obstructions. A space, which is formed over a large area on one side by the facing surface of the base, and which is traversed by the cooling air while absorbing heat, is accordingly provided beneath the base of the article. The flow guide is positioned with the intention that an all-over contact suitable for the transfer of heat away from the base is established with the smallest possible pressure losses. Consideration can be given to routing each flow guide, with which these boundary conditions are met at least approximately, between the orifices in the setting plate that are intended for the supply and the extraction of cooling air in order to achieve the abovementioned object. The fact that a build-up of pressure below the base of the hollow glass article only arises in accordance with unavoidable flow resistances in the cooling air guide means that the throughflow of cooling air can be increased significantly in each case in relation to the prior art presented by way of introduction, a circumstance which can be utilized, on the other hand, to increase the cooling performance and thus to increase the throughput of the glass molding process. The approach to achieving the object described by way of introduction thus involves measures which relate to guiding the flow of the cooling air underneath the hollow glass article, all of which have the aim of minimizing flow resistances, so that the stability of the glass article as it stands upright is assured at a limited back pressure, and the greatest possible throughput of cooling air can be achieved while maintaining this condition.

As additional features, the orifices are situated inside the standing surface arranged with at least approximately cross-sectionally identically dimensions for the supply and the extraction of cooling air. This relates to a possible design-related implementation aimed at avoiding the development of an over-dimensioned back pressure.

Other features of the invention relate to a flow path for the cooling air. Hollow glass articles with a concave, curved base, for example in the form of a spherical segment, which defines a cavity that is delimited peripherally by the standing surface and is bounded in other respects by the facing surface of the setting plate, is utilized for providing the throughflow of cooling air. An ongoing limitation of the pressure build-up beneath the base of the hollow glass article is also assured at a higher throughput of cooling air by, for example, the at least approximately cross-sectionally identically dimensioned orifices in the setting plate intended for the supply of cooling air into and the extraction of cooling air from this space. Taking into account the transfer of heat to the cooling air, consideration must also be given fundamentally to such dimensioning of the cross sections for the supply and the extraction of cooling air, which are larger in the case of the latter. The configuration of the aforementioned orifices and their pattern on the surface of the setting plate is designed in every case having regard to the achievement of a flow with the lowest possible associated pressure losses, yet which assures an intensive exchange of heat with the base.

Still additional features include a network of grooves arranged between the first and second part of the orifices which network of grooves is formed in the surface of the setting plate facing towards the hollow glass article. Such features are adapted for the case in which the hollow glass article exhibits a smooth or almost smooth base, so that the space in the surface of the setting plate intended for the throughflow of cooling air is displaced inwards and is formed here by the network of grooves. This should cover the base to be cooled as uniformly as possible and should thus provide an intensive exchange of heat with the base. In this case, too, the pattern of the aforementioned orifices on the setting plate should be designed having regard for a flow guide with low pressure losses, so that in a further context an increase in the throughput of cooling air is possible while at the same time retaining the stability of the hollow glass articles. The cross section of each of the grooves in the network of grooves is delimited on one side by the base of the article, so that relatively broad grooves are appropriate for the achievement of favorable heat transfer conditions, in conjunction with which the sections of the surface of the setting plate between the grooves form the supporting surface for the hollow glass article.

According to yet more features of the invention, cooling of the base is also supplemented by cooling of the walls, which is proposed by an arrangement of orifices in the setting plate in conjunction with the cooling air supply radially outside the standing surface of the hollow glass article. It is important for this arrangement that uniform cooling of the article is achieved in the peripheral direction, which requires the adjustment of a correspondingly arranged flow passing uniformly over the surface of the article.

Alternatives are provided for the control of the flows of cooling air on the base and at the sides of the article. In the simplest case, all the cooling air flows are combined and are only capable of being controlled together. However, the cooling air flows at the base and at the side can also be capable of being controlled independently of one another. In particular, the possibility can be provided for intermittent operation or for program-controlled operation according to a preferred timetable that can be set for the cooling air flows at the base and/or at the side. A control circuit for influencing the cooling air flows in this way in accordance with a preset cooling effect can also be proposed. Particularly advantageous in this context is the use of proportional valves, which permit the adjustment of optimized cooling air flows for the purposes of the cooling effect.

In features of another embodiment, the orifices in the setting plate which provide the cooling air are connected to a manifold pipe. This is intended as an easily achievable design-related embodiment of the setting plate, in which the orifices intended for the supply of cooling air are in connection via individual pipes with a cooling air supply embodied as a manifold pipe. The setting plate generally constitutes one wall of a housing, which in this case at the same time can serve to receive the heated cooling air and to take care of its orderly disposal.

As a further embodiment of the setting plate, a cooling effect is proposed additionally along a displacement path for the hollow glass articles. This can be subjected to cooling air flows on the base side, in a similar manner to the standing surface, which air flows are optimized in respect of the development of back pressure and the throughput of cooling air. Simpler cooling air guides can also be considered here, however.

The setting plate arrangement according to the invention, on the basis of the proposal for a defined flow field beneath the base of the hollow glass article, in any case permits a significant increase in the throughflow of cooling air in comparison to the prior art presented by way of introduction in the absence of the risk of disadvantageous effects on the rest of the glass molding process.

BRIEF DESCRIPTION OF THE DRAWINGS

The invention is described below in more detail with reference to the illustrative embodiments depicted schematically in the drawings. In the drawings.

DETAILED DESCRIPTION OF THE INVENTION

Figure 1:
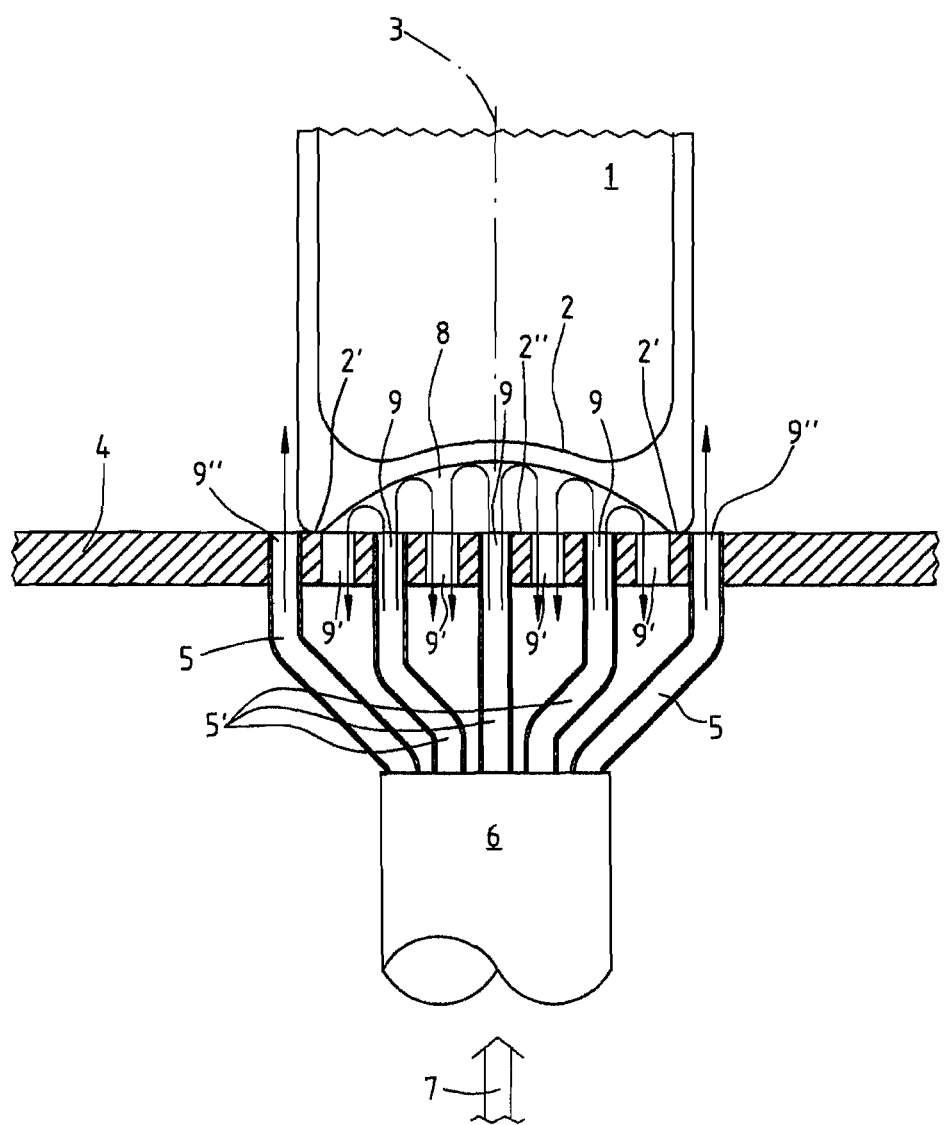
FIG. 1 depicts an illustrative embodiment of a setting plate arrangement according to the invention in a vertical section.

The reference 1 is used to designate a hollow glass article for cooling, of which the base 2 exhibits a curvature that is concave towards the outside and is rotationally symmetrical in the longitudinal axis 3 of the article. A direct standing surface 2" is thus formed only by a comparatively narrow annular surface 2' constituting the external edge of the base 2.

The reference 4 is used to designate a setting plate, which forms the upper horizontal boundary of a casing, although this is not illustrated here. The setting plate 4 is provided with a pattern of orifices, some of which are in continuous connection with pipes 5, 5', and some of which only provide continuous connections between the half spaces beneath and above the setting plate 4 that is held horizontally.

All the pipes 5, 5' are combined together in a cooling air supply line 6, which is in connection with a pressure source, for example a fan, although this is not illustrated here, which supplies cooling air in the direction of the arrow 7.

The base 2 with the facing surface of the setting plate 4 defines a cavity 8 in the form of a spherical segment, and the pattern of the aforementioned orifices depending on the standing surface 2" of a hollow glass article 1 is arranged with the intention that, within the standing surface, the entirety of the cross sections of all the orifices 9 in continuous connection with the pipes 5' and the entirety of the cross sections of all the other orifices 9' situated within the standing surface, to which no pipes are connected, are dimensioned with the intention that a maximum throughput of cooling air is achieved within the cavity 8, but without jeopardizing the stability of the hollow glass article 1 as it stands upright or its tip-over stability through the accompanying back pressure. The flow guide through the cavity 8, in which the design and the dimensions of the orifices 9' are also included, should thus be embodied in such a way that the development of back pressure, in spite of an increased throughput of cooling air in comparison to the prior art presented by way of introduction, is as small as possible and in any case does not adversely affect the stability of the hollow glass article as it stands upright.

An improved extraction of heat is associated with the throughput of cooling air that is increased in this way, so that the period of time required for adequate cooling can be reduced.

The reference 9" is used to designate an arrangement of orifices surrounding the annular surface 2' externally in a uniform pattern, to which orifices pipes 5 are also connected. The cooling air exiting from the mouths of these orifices 9" on the top side surrounds the hollow glass article 1 and stands in a uniform heat exchange relationship with its side walls when viewed in the peripheral direction.

The cooling air exiting from the orifices 9" on the top side is able in the simplest case, in conjunction with its guiding along the hollow glass article 1, to escape into the surrounding atmosphere in the same way as the cooling air exiting from the orifices 9' on the bottom side. These hot air-conducting air flows, in particular the air flow exiting via the orifices 9' beneath the cavity 8, can also be collected, however, for the purpose of the relief of the immediate environment, and sent for orderly disposal.

The cooling air supply is appropriately configured in such a way that, in the simplest case, the total available air flow introduced via the cooling air supply line 6 is variable. In a further embodiment, the cooling air flows on the base and on the side can also be so arranged as to be capable of being controlled individually via the intermediate arrangement of valves in the indicated pipes 5, 5', so that locally different cooling performances are available.

It will be appreciated from the above embodiments that more rapid cooling, in particular of the base of a hollow glass article 1, can be achieved in a simple design-related manner with the setting plate arrangement according to the invention, a circumstance which lends itself in a simple manner to achieving an increase in the throughput of the glass molding process.

Figure 2:
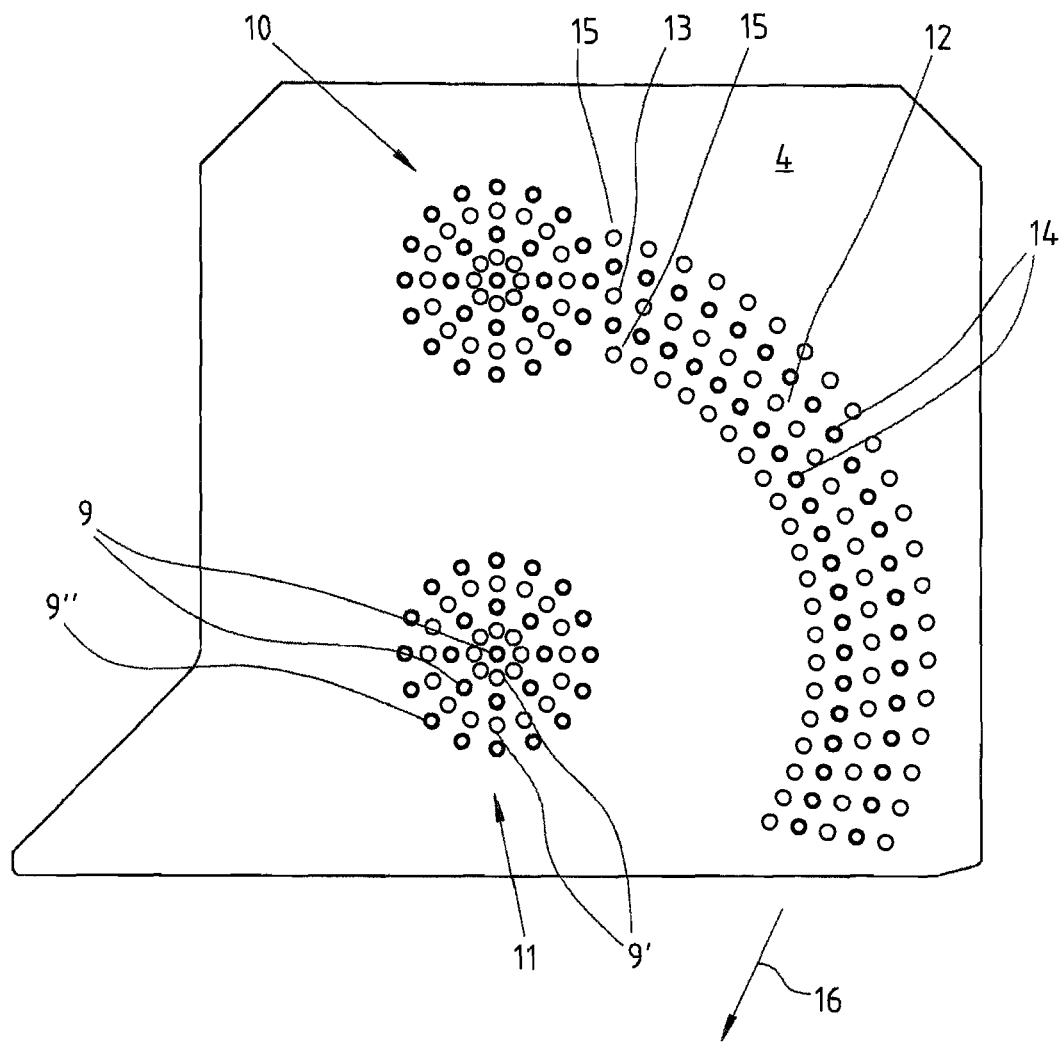
FIG. 2 depicts a view from above of a setting plate arrangement according to the invention together with a transport track assigned thereto.

FIG. 2 shows a setting plate 4, on which only two mutually identical and mutually separate standing positions 10, 11 for hollow glass articles are depicted by way of example, which are characterized in each case by mutually concentric arrangements of orifices 9, 9', 9", and which thus correspond to the setting plate arrangement illustrated in FIG. 1.

In order to extend the cooling effect, which the hollow glass articles experience in this standing position 10, 11, along their displacement path 12 on the setting plate 4 in the direction of a conveyor belt, although this is not illustrated here, the displacement path is characterized by the arrangement of additional orifices one behind the other. What is involved here is a central row of orifices 13, which is present between two rows of orifices 14, wherein a further row of orifices 15 is present in each case to either side of the last-mentioned rows and, to be precise, in an outward direction from these in each case.

All of these rows extend along mutually concentric circular paths, so that a displacement direction indicated by the arrow 16 is produced. Consideration can also be given to a linear displacement path or a curved path according to special requirements.

It is important, in analogy to the specific function of the orifices 9, 9' within the annular surface 2' (FIG. 1), that the orifices 13, 15 of the central rows and of the two outer rows are in connection with a cooling air supply line, and that the orifices 14 of the two rows to either side of the aforementioned central row are arranged for the extraction of cooling air. It is also important that the flow guide and the dimensioning of the cross sections of the additional orifices 13, 14, 15 of the aforementioned rows are designed in an identical manner to those of the orifices 9, 9' of a setting plate arrangement and a standing position 10, 11, so that a greatest possible throughput of cooling air can be achieved within the cavity 8 surrounded radially by the standing surface 2" and bordered in other respects by the base 8 of a hollow glass article 1 and accompanied by the greatest possible cooling efficiency.

Other cross-sectional geometries can be used, in particular annular slots, in place of the depicted peripherally distributed orifices 9, 9', 9" of a standing position 10, 11.

What is claimed is:

1. A setting plate arrangement for a glass molding machine, which machine molds a glass article having a base and an annular surface which forms an external edge of the base, and which article further has a standing surface defined by the annular surface; said setting plate arrangement comprising:

a hollow glass article having a base;

at least one setting plate held horizontally, said setting plate having at least one said hollow glass article standing upright to be cooled thereon and extending vertically therefrom, said setting plate having a facing surface which is that part of the setting plate facing said glass article base, said facing surface and said base of the hollow glass article forming a cavity between the base and the facing surface and which is delimited peripherally by the standing surface;

a cooling air supply conduit for providing cooling air;

orifices provided in said setting plate for the passage of cooling air;

a first part of said orifices, disposed within the facing surface is arranged for the supply of cooling air to the article base, and is connected to the cooling air supply conduit to receive cooling air therefrom;

a second part of said orifices, which are not included in the first part of said orifices, disposed within the facing surface and arranged for the removal of cooling air;

said first and second parts of said orifices being positioned within said facing surface so as to be in fluid communication with said cavity such that said first part of said orifices provides said cooling air from said cooling air supply to said cavity and said second part of said orifices provides for the removal of cooling air from said cavity; and wherein an all-over flow guide for the cooling air providing a transfer of heat with the base of the hollow glass article is arranged between said first and second parts of the orifices, and wherein the orifices situated within the facing surface are arranged for the supply and removal of cooling air so as to provide the largest possible throughput of cooling air while retaining the stability of the hollow glass article as it stands upright on the standing surface and limiting the development of a back pressure.

2. A setting plate arrangement according to claim 1, wherein the orifices of the first part of said orifices have approximately the same cross-sectional dimensions as the orifices of the second part.

3. A setting plate arrangement according to claim 2 wherein said first and second parts of said orifices are arranged in a pattern configured to provide a uniform flow of cooling air over the base.

4. A setting plate arrangement according to claim 2 further comprising a network of grooves arranged between the first and second part of the orifices, which network of grooves is formed in the facing surface of the setting plate so as to provide a flow guide for the cooling air covering the base at least approximately uniformly starting from the first part of the orifices, from which the cooling air is supplied, in the direction of the second part of the orifices, from which the cooling air is removed.

5. A setting plate arrangement according to claim 2 further comprising at least one arrangement of third orifices provided in said setting plate and in fluid communication with said cooling air conduit for receiving cooling air therefrom, said arrangement of third orifices being arranged to surround the standing surface of the hollow glass article when standing on said setting plate so as to provide a cooling air flow surrounding the upright hollow glass article laterally at least approximately uniformly.

6. A setting plate arrangement according to claim 1 wherein said first and second parts of said orifices are arranged in a pattern configured to provide a uniform flow of cooling air over the base.

7. A setting plate arrangement according to claim 6 further comprising a network of grooves arranged between the first and second part of the orifices, which network of grooves is formed in the facing surface of the setting plate so as to provide a flow guide for the cooling air covering the base at least approximately uniformly starting from the first part of the orifices, from which the cooling air is supplied, in the direction of the second part of the orifices, from which the cooling air is removed.

8. A setting plate arrangement according to claim 6 further comprising at least one arrangement of third orifices provided in said setting plate and in fluid communication with said cooling air conduit for receiving cooling air therefrom, said arrangement of third orifices being arranged to surround the standing surface of the hollow glass article when standing on said setting plate so as to provide a cooling air flow surrounding the upright hollow glass article laterally at least approximately uniformly.

9. A setting plate arrangement according to claim 1 further comprising a network of grooves arranged between the first and second part of the orifices, which network of grooves is formed in the facing surface of the setting plate so as to provide a flow guide for the cooling air covering the base at least approximately uniformly starting from the first part of the orifices, from which the cooling air is supplied to said cavity, in the direction of the second part of the orifices from which the cooling air is removed from said cavity.

10. A setting plate arrangement according to claim 9 wherein said first and second parts of said orifices are arranged in a pattern configured to provide a uniform flow of cooling air over the base.

11. A setting plate arrangement according to claim 1 further comprising at least one arrangement of third orifices provided in said setting plate and in fluid communication with said cooling air conduit for receiving cooling air therefrom, said arrangement of third orifices being arranged to surround the standing surface of the hollow glass article when standing on said setting plate so as to provide a cooling air flow surrounding the upright hollow glass article laterally at least approximately uniformly.

12. A setting plate arrangement according to claim 1 wherein the cooling air supply line is arranged with regard to providing control of the cooling air flow from all the orifices of the setting plate used for the supply.

13. A setting plate arrangement according to claim 12 further comprising a control means permitting the intermittent operation of the cooling air flow/the cooling air flows.

14. A setting plate arrangement according to claim 12 further comprising pneumatic proportional valves utilized for the control of the cooling air flow.

15. A setting plate arrangement according to claim 1 wherein the cooling air supply line is arranged with regard to an individual control of the cooling air flows supplied inside and outside the standing surface.

16. A setting plate arrangement according to claim 1 wherein the orifices in the setting plate intended for the supply of cooling air are in connection via individual pipes with the cooling air supply line embodied as a manifold pipe.

17. A setting plate arrangement according to claim 1 further providing a displacement path for the transport of said upright hollow glass article disposed on at least one standing surface of the setting plate, the displacement path includes a pattern of additional orifices in said setting plate for the supply and removal of cooling air, which additional orifices are arranged such that a throughput of cooling air providing an exchange of heat with the base of the hollow glass article can be achieved at least approximately at every point along the displacement path while maintaining the stability of the glass article as it stands upright thereon and limiting the development of back pressure.

18. A setting plate arrangement according to claim 1 having multiple first orifices of said first part of said orifices provided in said facing surface and multiple second orifices of said second part of said orifices provided in said facing surface, and wherein said first and second parts of said orifices are arranged in a pattern such that there is at least one of said second orifices adjacent to each of said first orifices.

19. A setting plate arrangement according to claim 18 wherein said first orifices are arranged to form at least one concentric ring in said setting plate, and said second orifices are arranged to form at least two concentric rings in said setting plate.

* * * * *